(12) United States Patent
Green et al.

(10) Patent No.: US 6,854,107 B2
(45) Date of Patent: Feb. 8, 2005

(54) METHOD OF AND SYSTEM FOR DESIGNING AN N-TIER SOFTWARE ARCHITECTURE FOR USE IN GENERATING SOFTWARE COMPONENTS

(75) Inventors: David W. Green, Richmond, TX (US); Kevin L. Banks, Austin, TX (US); John W. Kiowski, Jr., Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 526 days.

(21) Appl. No.: 09/746,155

(22) Filed: Dec. 22, 2000

(65) Prior Publication Data

US 2002/0095650 A1 Jul. 18, 2002

Related U.S. Application Data

(60) Provisional application No. 60/173,914, filed on Dec. 29, 1999.

(51) Int. Cl.⁷ ................................................. G06F 9/44
(52) U.S. Cl. ........................ 717/117; 717/102; 717/108
(58) Field of Search ................................. 717/100–120, 717/124; 707/201–228

(56) References Cited

U.S. PATENT DOCUMENTS

| | | | |
|---|---|---|---|
| 4,828,028 A | 5/1989 | Soliman | |
| 4,870,564 A | 9/1989 | Ketelhut et al. | 364/200 |
| 4,916,617 A | 4/1990 | Norwood | 364/422 |
| 5,274,572 A | 12/1993 | O'Neill et al. | |
| 5,303,582 A | 4/1994 | Miska | |
| 5,457,797 A | 10/1995 | Butterworth et al. | 395/650 |
| 5,466,157 A | 11/1995 | Henderson et al. | |
| 5,504,672 A | 4/1996 | Hardiman et al. | 364/165 |
| 5,815,717 A * | 9/1998 | Stack | 717/105 |
| 5,847,975 A | 12/1998 | Henderson et al. | |
| 5,848,246 A * | 12/1998 | Gish | 709/228 |
| 5,857,197 A | 1/1999 | Mullins | |
| 5,881,230 A | 3/1999 | Christensen et al. | |
| 5,889,520 A | 3/1999 | Glaser | 345/349 |

(List continued on next page.)

OTHER PUBLICATIONS

Principles of Object Oriented Analysis and Design, Oct. 29, 1992, Chapters 1–22 and Appendix A, James Martin.

Object–Oriented Analysis and Simulation, Chapters 1–7 and Appendixes A and B, 1996, David R.C. Hill.

Fox, Otto; "Using BeanExtenders Dipping Technique;" Component Technology, IBM Software Solutions Division; Mar. 1998, pp. 1–8.

U.S. Appl. No. 09/746,362 entitled Method and System and Article of Manufacture for an N–Tier Software Component Architecture Oilfield Model filed Dec. 22, 2000.

*Primary Examiner*—Tuan Dam
*Assistant Examiner*—Chuck Kendall
(74) *Attorney, Agent, or Firm*—Cantor Colburn LLP

(57) ABSTRACT

A system and method for designing a software architecture for utilizing software components in building extensible N-tier software applications is described, the method comprising specifying a set of software component rules for creating software components; specifying a set of tier rules for creating tiers; and specifying a set of assembly rules further comprising association rules by which each tier may be associated with at least one software component and linkage rules by which each tier may be linked to at least one other tier. The tier rules may further comprise a set of association rules by which each tier created with the set of tier rules may be associated with at least one software component created using the software component rules; a set of tier framework rules to provide an architected context for software components within a tier; and a set of package rules to provide for logical grouping of interfaces within a framework defined by the tier framework rules to provide a set of specific behaviors for the tier.

33 Claims, 6 Drawing Sheets

U.S. PATENT DOCUMENTS

| | | |
|---|---|---|
| 5,889,942 A | 3/1999 | Orenshteyn |
| 5,978,582 A | 11/1999 | McDonald et al. ......... 395/702 |
| 6,006,230 A | 12/1999 | Ludwig et al. |
| 6,134,594 A | 10/2000 | Helland et al. ............. 709/229 |
| 6,182,756 B1 | 2/2001 | Garcia et al. |
| 6,202,200 B1 | 3/2001 | House et al. ................... 171/4 |
| 6,263,498 B1 * | 7/2001 | Alcorn et al. ............... 717/120 |
| 6,266,666 B1 | 7/2001 | Ireland et al. ................ 707/10 |
| 6,446,113 B1 * | 9/2002 | Ozzie et al. ................ 709/204 |

* cited by examiner

METHOD OF AND SYSTEM FOR DESIGNING AN N-TIER SOFTWARE ARCHITECTURE FOR USE IN GENERATING SOFTWARE COMPONENTS

CROSS-REFERENCES TO RELATED APPLICATIONS

This nonprovisional U.S. national application, filed under 35 U.S.C. § 111 (a), claims, under 37 C.F.R. § 1.78(a)(3), the benefit of the filing date of provisional U.S. national application No. 60/173,914, attorney docket no. D5407-00109, filed on Dec. 29, 1999 under 35 U.S.C. § 111(b), the entirety of which is incorporated herein by reference.

BACKGROUND OF THE INVENTION

1. Field of the Invention

The present invention relates to software design of software architectures and, in particular, to the design of a software component architecture for the development of extensible tier software component applications, including compiled, interpreted, and on-the-fly applications.

2. Description of the Related Art

A variety of techniques are used by a programmer or code developer to design or generate software program code. In one approach, software applications are designed as "monolithic" structures in which the various functions, such as data storage and application logic, are completely entwined. For example, given a set of system specifications and functions which are to be implemented by a given application or program, the code developer designs a monolithic, independently executable program which implements the desired functions. The programmer may use, for example, a high-level programming language such as C++ and a code development tool to generate the high-level language, which is then compiled by a compiler to provide an executable version of the program.

One problem with this approach is that the applications are difficult to maintain, and separate functional portions of the program are difficult to reuse because all portions of the program are entwined and application-specific.

Accordingly, in the software field various software architectures have been developed in which application functionality is broken down into smaller units, such as objects or components. These units may be assembled to provide the overall functionality for a desired application. For example, a group of components may be assembled and compiled to provide a stand-alone, executable program. Alternatively, the components may be invoked and used in real-time, when the component's functionality is needed.

Because of the resource expenditure necessary to develop these units, it is desirable to be able to reuse these units, so that their functionality may be employed in subsequent applications without having to "re-invent the wheel" each time this functionality is needed. In current software architectures, such as two-tier and three-tier architectures, some portions, such as data repositories and user interfaces, are relatively easy to reuse. However, other types of components, such as those implementing application logic, are still clumped in large blocks, making reuse of these components or their various functions difficult. There is a need, therefore, for improved software component architectures and related software component development techniques that avoid the drawbacks of the prior art.

BRIEF DESCRIPTION OF THE DRAWINGS

These and other features, aspects, and advantages of the present invention will become more fully apparent from the following description, appended claims, and accompanying drawings in which:

DETAILED DESCRIPTION

Figure 1:
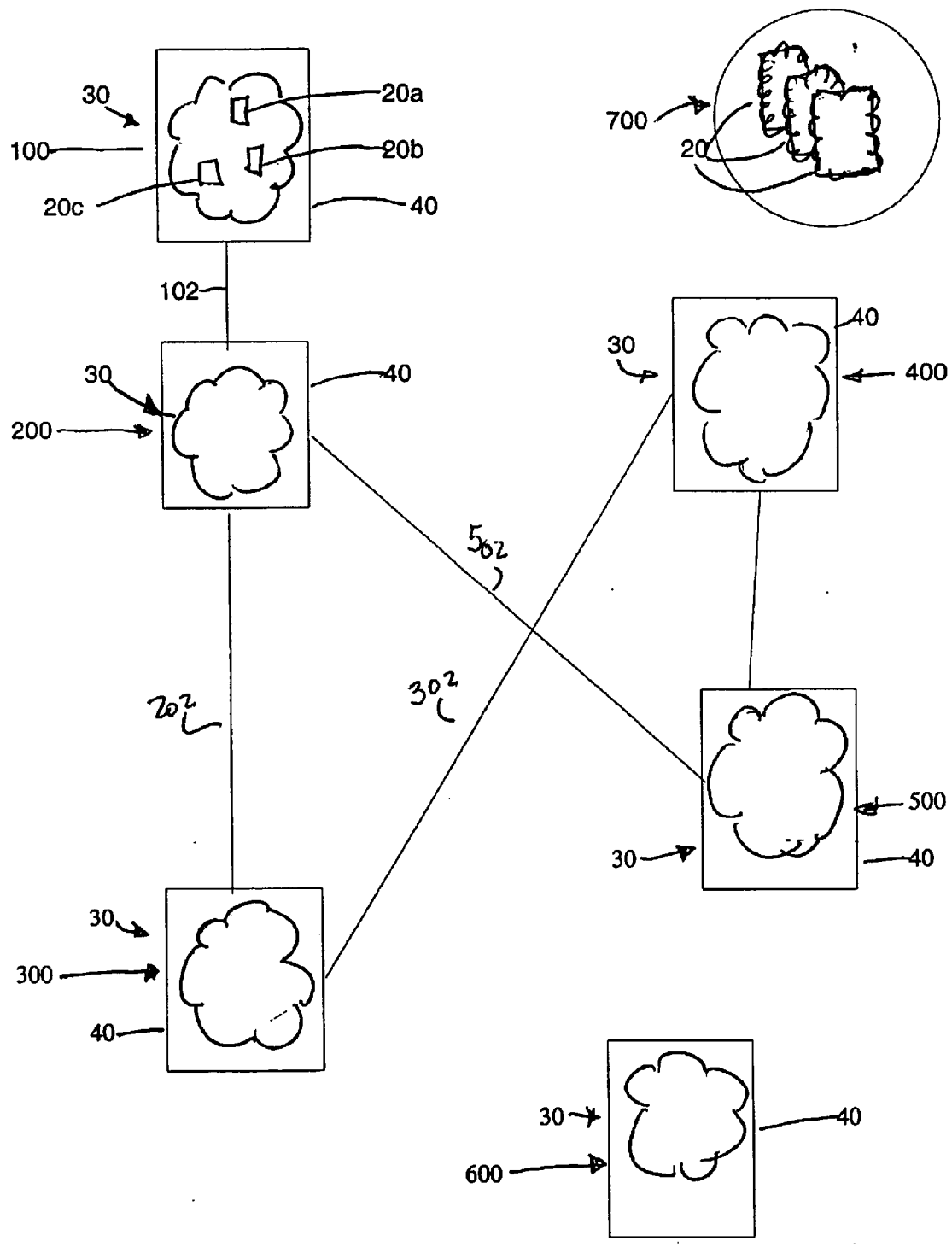
FIG. 1 is a diagrammatic representation of the present invention's "N-tier architecture" paradigm.

Referring generally to FIG. 1, the present invention comprises a methodology that applies an engineering and manufacturing oriented approach to software production based on a well-defined architecture. As used herein, "manufacturing" implies a method analogous to a software factory. Using the present invention methodology, software application development can proceed as if it was a software manufacturing process with an assembly line capable of assembling all types of intellectual property quickly and at the lowest cost The present invention uses an "N-tier architecture" paradigm. In an N-tier architecture, all functionality is broken down at the system level into logical chunks or tiers 30 that perform a well-defined business function. In the present invention's N-tier architecture there is no limit to the number of tiers 30.

The present invention's N-tier software design architecture is employed to develop software components 20 (shown in FIG. 1 as 20a, 20b, and 20c). As those of ordinary skill in the programming arts will appreciate, "N-tier" in the prior art may be thought of as implying a hierarchy such as with protocol stacks. However, as used herein, "N-tier" describes an architecture that is characterized by a plurality of "N" tiers 30, each of which has a specified type and a specified interface. Although a hierarchy can be defined for the tiers, no hierarchy is implicit in the N-tier architecture of the present invention.

Each software component 20 to be developed is associated with at least one tier 30, depending upon the nature of the functions to be performed by that software component 20 and tier 30. The present invention specifies a method and a system for creating architectures to implement an N-tier system wherein a software component designer can design or select each software component 20 to perform specified functionality and ensure that each software component 20 has the interfaces specified by the architecture for that tier 30.

Using the methodology of the present invention, there is no limit to the number of tiers 30 or software components 20 that can be implemented or defined. Rules for the architecture are specified whereby tiers 30 are not necessarily part of a hierarchy as in two- or three-tier systems, but are logically interconnected using standardized interfaces so that each tier 30 can interact with one or more other tiers 30 as needed, i.e., a software component 20 within a given tier 30 can interact with software components 20 of one or more other tiers 30 as necessary.

The following terms are understood to have the following meanings to those of ordinary skill in the programming arts for the present invention:

| TERM | DEFINITION |
|---|---|
| Architecture | A set of design principles and rules used to create a design. |
| COM | Component Object Modeling. |
| Component | An object that encapsulates, or hides, the details of how its functionality is implemented and has a well-defined interface reusable at a binary level. |
| CORBA | Common Object Request Broker Architecture |
| DCOM | Distributed Component Object Model |
| DLL | Dynamic Link Library |
| eventhandler | message handling object |
| Framework | An architected context for business objects that modify the business objects' attributes or add new behavior. |
| GUID | Globally unique identifier, e.g. a number having a predetermined number of bits that uniquely identifies a software component |
| JAVA | a programming language |
| Model | A heterogeneous collection of components whose relationships are enforced via a predetermined set of rules; a collection or instantiation of software components where the collection or instantiation may be organized into a hierarchy |
| Object | A programming structure encapsulating both data and functionality that are defined and allocated as a single unit and for which the only public access is through the programming structure's interfaces. A COM object must support, at a minimum, the IUnknown interface, which maintains the object's existence while it is being used and provides access to the object's other interfaces. |
| Package | A logical grouping of interfaces within a framework that provide a specific behavior such as messaging or connecting. |
| Sink | Connection sink for messaging. |
| Source | Connection source for messaging |
| Tier | A logical grouping of components that perform a well-defined, predetermined function. |

It is understood that these descriptive constructs are not limitations of the present invention, the scope of which is as set forth in the claims, but are rather meant to help one of ordinary skill in the software programming arts more readily understand the present invention. More information on these functions and naming conventions, and on COM objects in general, can be found in the Microsoft Developer's Network (MSDN) Library (January 1999), published by Microsoft Press and incorporated herein by reference.

A given N-tier architecture may be designed using the principles, rules, and methods of the present invention to satisfy the needs and characteristics of a given industry. The particular N-tier architecture designed in accordance with the present invention is then used to generate software components 20 for an application. As used herein, "application" is understood to include compiled, interpreted, and on-the-fly applications, such as, by way of example and not limitation, CORBA, just-in-time, JAVA, and the like, as these terms are understood by those of ordinary skill in the software programming arts. A "wizard" or other code development tool may also be designed, based on a particular N-tier architecture, which allows the code developer to generate software components 20 within the specifications of the particular N-tier architecture. For example, the wizard may permit the code designer to generate a software component 20 by selecting the tier 30 for the software component 20 and ensuring that the software component 20 is in compliance with the interface standards designated for software components 20 of that particular tier 30.

Referring still to FIG. 1, in an N-tier architecture designed using the present invention, the present invention defines a methodology for specifying rules and methods that enable applications to be constructed. A typical application built using architectures created with the present invention have functionality broken down at the system level into logical chunks or tiers 30 that perform a well-defined function, such as a business function, according to rules as set forth herein. In a currently preferred embodiment, each tier 30 logically groups together software components 20 that have a similar type of behavior.

As discussed herein below, framework 40 is an architected context for software components 20 in a tier 30; that is, framework 40 specifies a basic design structure, including base software components 20, and a set of standard interfaces for any software component 20 categorized as belonging to that tier 30. Framework 40 comprises one or more packages 42 which provide a method for collecting software components 20 and represent interfaces. A package 42 is a collection of interfaces that provide a specific behavior, such as messaging or connecting. Frameworks 40 may have more than one package 42.

Each tier 30 is thus a logical grouping of packages 42 comprising discrete software components 20 which adhere to the rules of the present invention. In a currently preferred embodiment, all software components 20 created for or used by an application are put into an inventory (or catalog) 700 of components, so that each software component 20 may be reusable by other application efforts. Further, software components 20 are thus available for use by any other software component 20 that can use its interface, including off-the-shelf components. Off-the-shelf components, e.g. purchased components, may be incorporated into the N-tier architecture of the present invention such as by adding a predetermined interface to that off-the-shelf component as required by the N-tier architecture of the present invention.

The present invention encompasses rules and methods to allow software components 20 developed in accordance with a specified N-tier architecture to be used in a variety of ways. For example, rules may exist to allow a group of N-tier architecture software components 20 to be assembled and compiled to provide a stand-alone, executable program. Alternatively, rules may exist to allow software components 20 to be combined into tiers 30 and invoked at run-time, to form new unique applications on-the-fly.

The present invention further encompasses rules to allow new software components 20 to be created or purchased and then added to inventory 700 for future reuse. Inventory 700 may then be reused for subsequent applications. As more software components 20 are developed, inventory 700 grows, thus further reducing the time and resources needed to develop new applications.

The present invention also encompasses rules to allow a given N-tier architecture to be extended, for example by adding a new tier 30 to result in a new, N+1-tier architecture. Many software components 20 developed for the predecessor N-tier architecture will be immediately reusable in the incremental, N+1-tier architecture, and others will be reusable with relatively minor modifications.

In one embodiment, the present invention provides rules to define and create a particular N-tier architecture with a specified, initial number and type of tiers 30 and with a specified interface architecture for each tier 30, where each initial tier 30 satisfies one of a major portion of system functionality, such as business logic (processing), data, and the like.

An N-tier architecture defined and implemented using the present invention may be thus adapted for use in numerous industries and contexts, for example ship-building arts or medical arts as well as geological industry type business objects. Each tier 30 defined and implemented using the present invention specifies the types of interfaces that software components 20 associated with that tier 30 must have. These interfaces are thus standardized interfaces for that N-tier architecture that allow software components 20 of a type of tier 30 to be accessed by other software components 20 in other tiers 30. A software component designer using the present invention defines the rules for building software components 20 with the knowledge or ability to access other software components 20, based on the interface specified by tier 30 for these types of software components 20.

In an embodiment, an N-tier architecture defined and implemented using the present invention may specify which other types of software components 20 (i.e. which tiers) that a given tier 30 must be able to access. In an alternative embodiment, this is left up to the software component designer.

Each tier 30 will tend to have a unique set of interfaces, depending on the nature of the types of software components 20 grouped under that tier 30. More common interfaces may include a specific, common first interface to allow a software component's 20 dependencies to be collected by that software component 20 and accessed by other components and a specific, common second interface to allow a software component 20 to be identified at run time by another component.

In an embodiment, the N-tier architecture of the present invention may utilize an asynchronous architecture paradigm permitting software components 20 to engage in asynchronous communication via asynchronous messaging.

In a currently preferred embodiment, software component 20 interfaces are implemented using Microsoft's COM specification. See, e.g., Essential COM by Don Box, published by Addison Wesley Longman, Inc, 1998 with an ISBN number of 0-201-63446-5. Only a software component's 20 external interfaces are seen by the outside world. Common interaction standards, such as ActiveX, may be used to facilitate communication between software components 20 and reduce the need for connective software between software components 20. Services provided by software components 20 may networked together to support one or more desired processes. These services can be reused and shared by other software components 20. However, it will be apparent to those of ordinary skill in the programming arts that software components 20 may be constructed using numerous other environmental paradigms, by way of example and not limitation including those required by LINUX, SUN (R) SOLARIS (R), Unix, or the like, or any combination thereof.

As currently contemplated, some tiers 30 may exist that are not true tiers 30, i.e. they do not exist to provide additional behavior to software components 20. These tiers 30, such as a Wizard, Testing, or Template tier 30 shown in FIG. 1 generally as tier 600, may be present to provide additional functionality. By way of example and not limitation, a Wizard tier 30 may exist to provide a set of interactive help utilities that assists developers in quickly creating standard present invention components. A Testing tier 30 may be present to contain software components 20 that exercise software components 20 or packages 42 from functional tiers 30, record test results in a log, and notify developers of the test completion status. Software components 20 in a Template tier 30 may provide C++ implementation of persistence, collections, and iterators for standard present invention software components.

Figure 2:
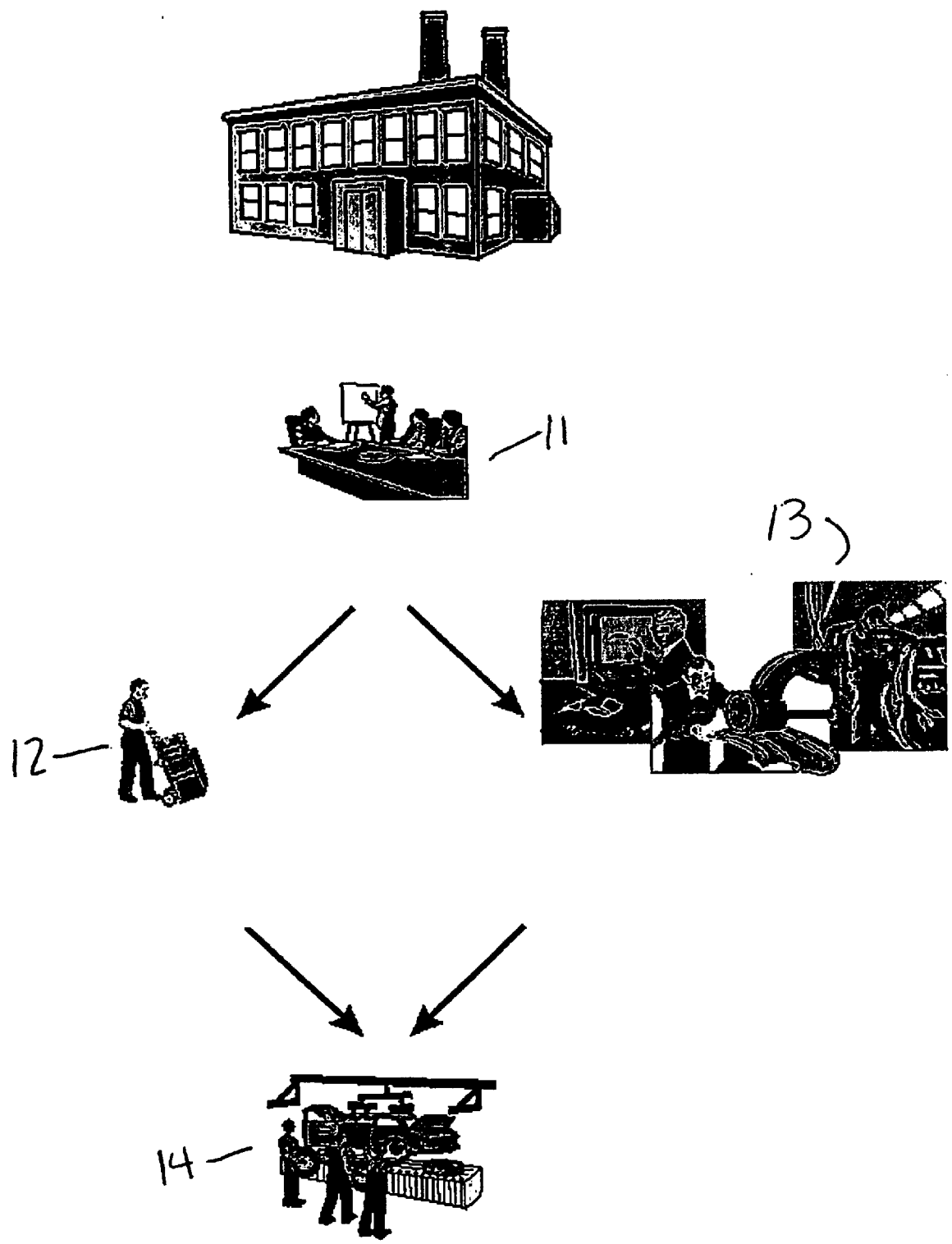
FIG. 2 is a pictographic representation of a software factory.

Referring now to FIG. 2, a pictographic representation of a software factory, software components 20, whether purchased or created, may be placed into inventory 700 for future use using library or cataloging processes, all of which are familiar to those of ordinary skill in the software programming arts. Software component 20 interfaces are standardized, with software component 20 functionality limited to the characteristics and behavior unique to the software components 20 they represent. The paradigm for the present invention is a software application assembly line as if in a software application factory. As shown at 11, application requirements are first determined. The existing inventory 700 is then reviewed 12 for software components 20 that fit the new application requirements. System requirements that do not exist as stock software components 20 are created or purchased 13 and possibly added to inventory 700. A new application may then be created 14 from the preexisting stock software components 20 and/or the new software components 20. The application may be created by combining software components 20 at run-time to form new unique applications on-the-fly, making software reuse a practical reality.

Figure 3:
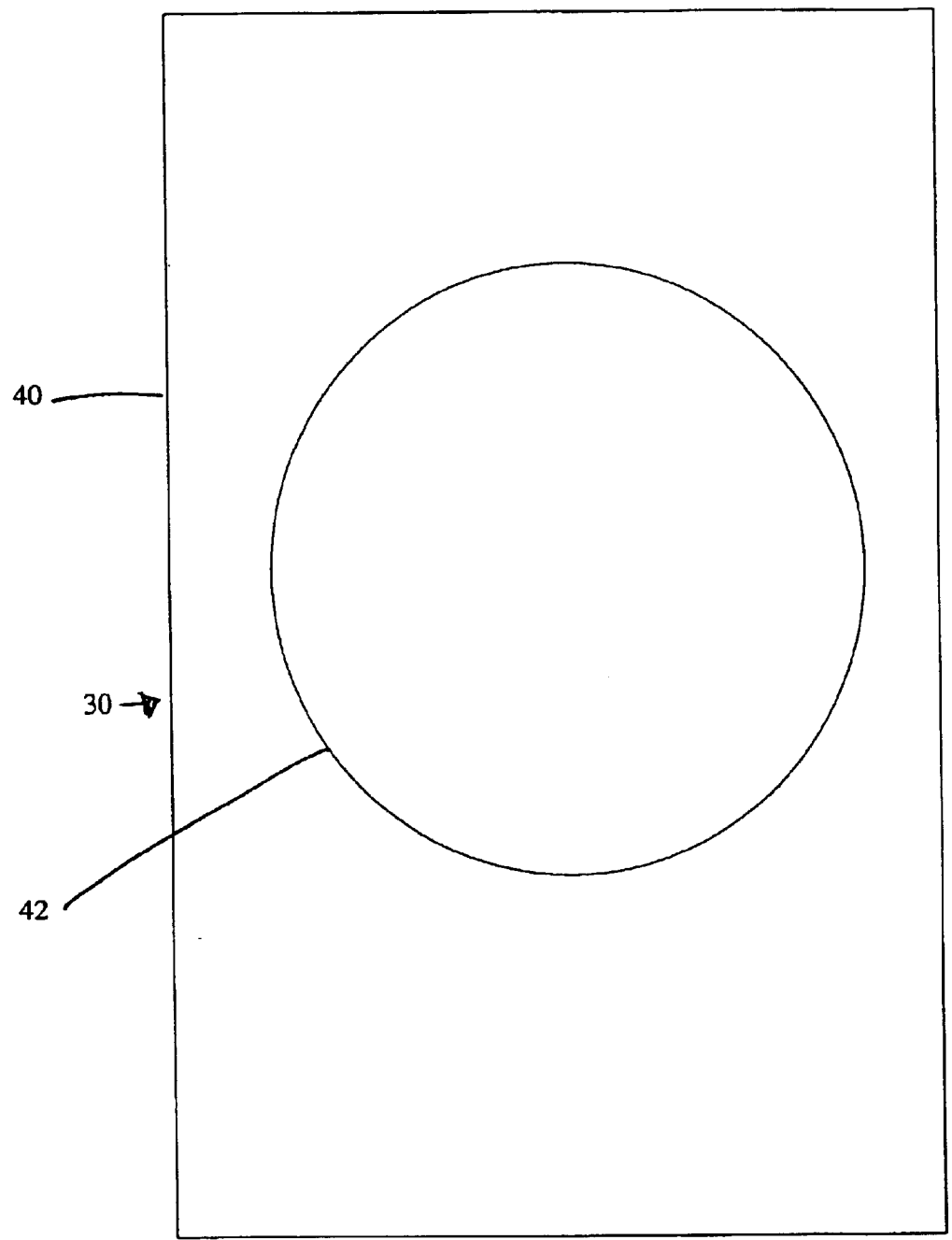
FIG. 3 is a diagrammatic representation of a framework.

Referring now to FIG. 3, framework 40 is an architected context for software components 20 in a tier 30; that is, framework 40 specifies a basic design structure, including base software components 20, of a tier 30. In addition, framework 40 specifies a set of standard interfaces for any software component 20 categorized as belonging to that tier 30. Framework 40 functions as a template or design pattern for tier 30, ensuring that basic design for tier 30 is uniform across projects.

In the present invention, frameworks 40 encompass major design decisions for their corresponding tiers 30, including what dependencies a framework 40 has to other frameworks 40, how properties and interfaces are grouped, what interfaces are used, and where software component 20 behavior belongs. For example, in a Visual tier 30 framework 40, a Model-View-Controller (MVC) may be used to specify the division of labor for visual software components 20. In the MVC, data are handled by the model, reaction to input is handled by the controller, and the view component handles drawing activities. By dividing the functionality up this way, different business models may use the same controller or many different views of the same business model.

Figure 4:
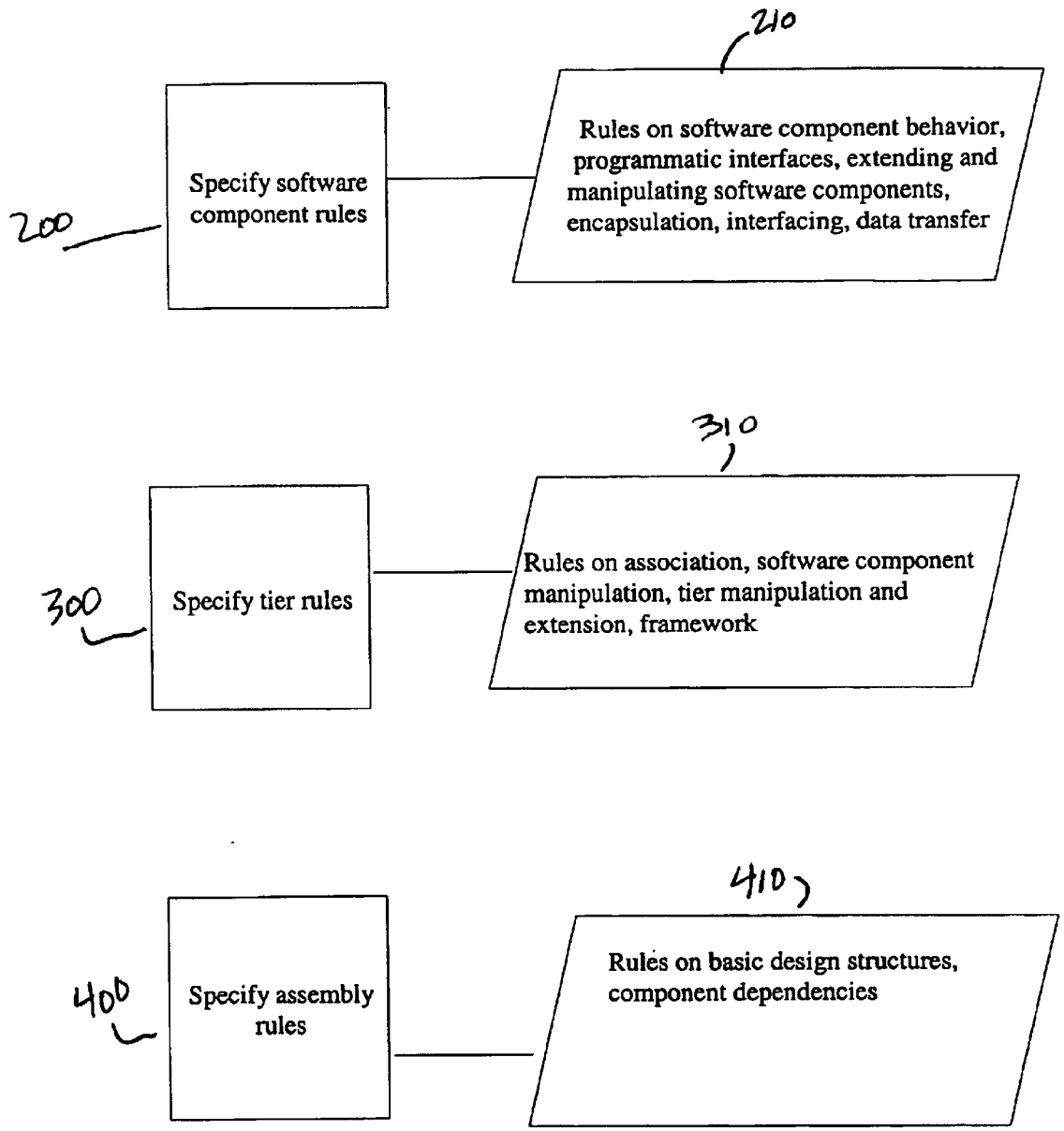
FIG. 4 is a flowchart diagram of rules.

Referring now to FIG. 4, the present invention's methodology allows creation of rules that allow tiers 30 in a software application system to be extensible and subject to change as long as the system is in production. Therefore, the system is not restricted to a pre-determined number of tiers; rather tiers 30 may be added, modified, or removed as the architecture and its applications evolve.

A system designer specifies 200 a set of software component rules 210, each software component rule 210 comprising a given programmatic interface, for at least one set of software components 20. It is anticipated that several sets of software components rules 210 may exist, but the currently preferred embodiment has a single set of software component rules 210. Software component rules 210 specified may further comprise rules on extending software components 20, such as addition, modification, and deletion rules.

Specifying 200 software component rules 210 also comprises specifying rules on specifying behavior exhibited by each software component. These rules 210 for specifying software component 20 behavior further comprise rules on how each software component 20 encapsulates details of how functionality is implemented for that software component 20 and rules on creating a well-defined interface reusable at a binary level for each software component 20 whereby each software component 20 may be made available for use by any other software component 20 that can use the well-defined interface of the first software component 20. Software component rules 200 allow for use of off-the-shelf software components 20 by other software components 20.

Specifying 200 software component rules also comprises specifying rules 210 on passing data to a software component, receiving data from a software component, manipulating software component 20 properties, and librarying or cataloging software components 20.

Specifying 200 software component rules may also comprise specifying rules for designating software component function points, where these rules for designating software component function points allow implementing software component interfaces required by a particular tier 30 to which the software component 20 belongs.

Specifying 200 software component rules comprises specifying rules for manipulating software component 20 properties such as rules for adding, changing, and removing properties from a software component. This may include specifying at least one modification software component rule 200 whereby a software component 20 created using the set of software component rules 200 can be modified individually, or an entire set of software component 20 rules can be manipulated, added, or deleted at one time. Other manipulating rules may be specified. By way of example and not limitation, it is often desirable to have a template iterator class to facilitate accessing associations. Such a template iterator class can be based at any software component's 20 associations and can be used to iterate through all software components 20 in the association or only through a specific software component type.

Librarying software components rules 210 are also specified including rules for adding, changing, and removing software components 20 from a software component 20 inventory 700 as well as rules on searching for and selectively retrieving software components 20 from inventory 700. This may include specifying a set of library rules to allow grouping a set of software components 20 created using the software component rules 210 into an interrogatable inventory 700 of software components, thus allowing for selectively placing software components 20 into and retrieving software components 20 from inventory 700. Additionally, library rules allow for addition off-the-shelf software components 20 to inventory 700.

Software components 20 may execute processes independently, reacting to received messages to start and continue their own processing and sending messages to other software components 20 to start and continue processing. Accordingly, the present invention incorporates software component rules 210 to allow asynchronous behavior in its basic architecture. Asynchronous behavior means that each software component 20 executes within its own thread and time frame, informing dependent software components 20 of its status or providing them with information when significant events occur. Because all present invention software components 20 operate independently, any software component 20 can be queried for its status.

De-coupled software components 20 in the present invention system communicate through the present invention's messaging system, which is also an asynchronous process. Messages communicate events, information, and status between software components 20. Each software component 20 may thus be event-driven, reacting to messages and events that are generated by other software components 20 in the system. In turn, each software component 20 generates its own events and communicates them back to the other software components 20 in the system.

The result of this architecture is that software components 20 operate independently, simplifying maintenance and increasing software component 20 usage.

Tier rules 310 must also be specified 300, including rules 310 on how tiers 30 are associatable with a set of software components 20 created using the software component rules 210. Tier rules 310 comprise interface rules to allow tiers 30 to interface programmatically; software component manipulation rules to allow addition, modification, and removal of software components 20 from a tier, and rules for testing software components 20 to ensure that these software components 20 comply with tier rules 310. Additionally, tier rules 310 allow for extending tiers 30 such as by specifying rules on allowing modification of software component 20 attributes for software components 20 associated with tier 30.

Tier rules 310 further comprise framework rules to specify how to allow the specification of dependencies a framework 40 has to other frameworks 40; how properties and interfaces are grouped; what interfaces are used; and where software component 20 behavior belongs within a tier 30.

Framework rules may further comprise rules on specifying at least one package 42 for a framework 40 where the package 42 further comprises a set of interfaces to provide a specific behavior.

Tier rules 310 are also specified for associating tiers 30 with software components 20, linking and setting processing sequencing, and processing states.

Additionally, it is often desirable to redefine software components 20 within tiers 30 or add or delete entire tiers 30 from an application. Accordingly, association rules provide for software components 20 created using software component rules 210 to be associated or disassociated from tiers 30. Tier rules 300 may further include behavior rules, interface rules, and rules defining dependencies on other tiers 30.

Assembly rules 410 are specified 400, comprising rules on methods of assembly of tiers 30 and software components 20 into final applications, by way of example and not limitation including specifying a basic design structure comprising base components for software components 20 in tiers 30 and specifying a set of standard interfaces for the software components 20 categorized as belonging to the tier 30. Additionally, assembly rules 410 may exist for defining component dependencies, including connection rules for applications. Assembly rules 410 may further comprise testing rules to ensure software components 20 adhere to requirements such as to tier interfaces, framework interfaces, and package interfaces. Further, one or more rules may exist to defining component dependencies, including connection rules, for on-the-fly applications as well as define how software components 20 advertise behavior capabilities present in that software component 20 including by way of example and not limitation communication interfaces.

Figure 5:
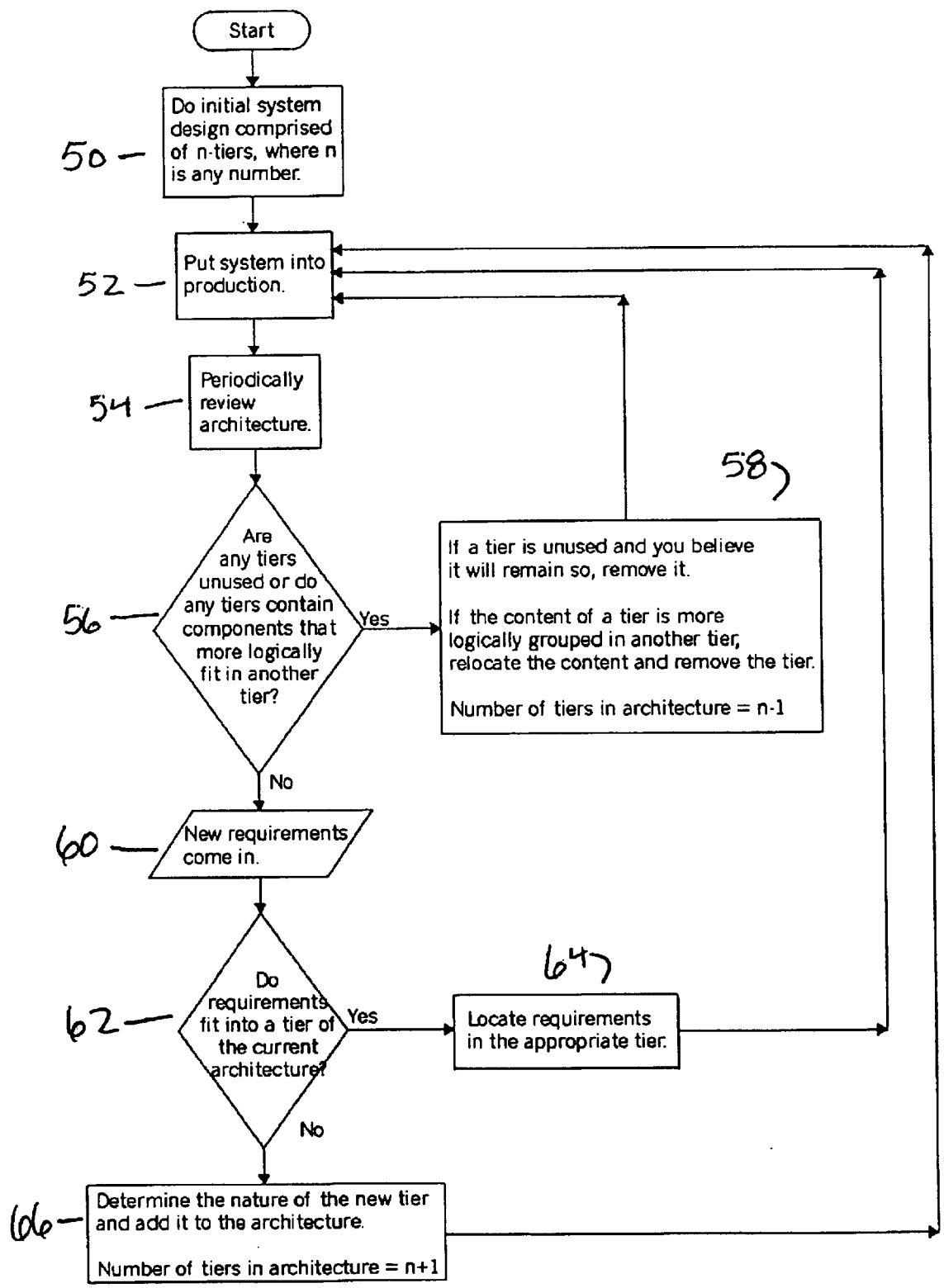
FIG. 5 is a flowchart representation of the present invention's life cycle rules.

Referring now to FIG. 5, a life cycle flowchart, the present invention's methodology allows application development to drive changes to the present invention's architecture using a set of life cycle rules. By way of example and not limitation, rules that define a desired software architecture are either designed as described above or selected from a preexisting set of rules. Thus, a software architecture designed using the present invention's method generates software components 20, tiers 30, and applications by using software component rules 210, tier rules 310, and assembly rules 410 for an initial design 50. The initial design may have a predetermined number of initial tiers 30.

The system implemented is put into production 52 and periodically reviewed for adjustments that may be necessary 54. If any tier 30 is determined to be in need of adjustment 56, it can be removed or otherwise modified 58. As additional requirements arise 60, new software components 20 are created or existing software components 20 modified 62, 64. Tiers 30 may be added, modified, or deleted 66 as application requirements dictate.

Figure 6:
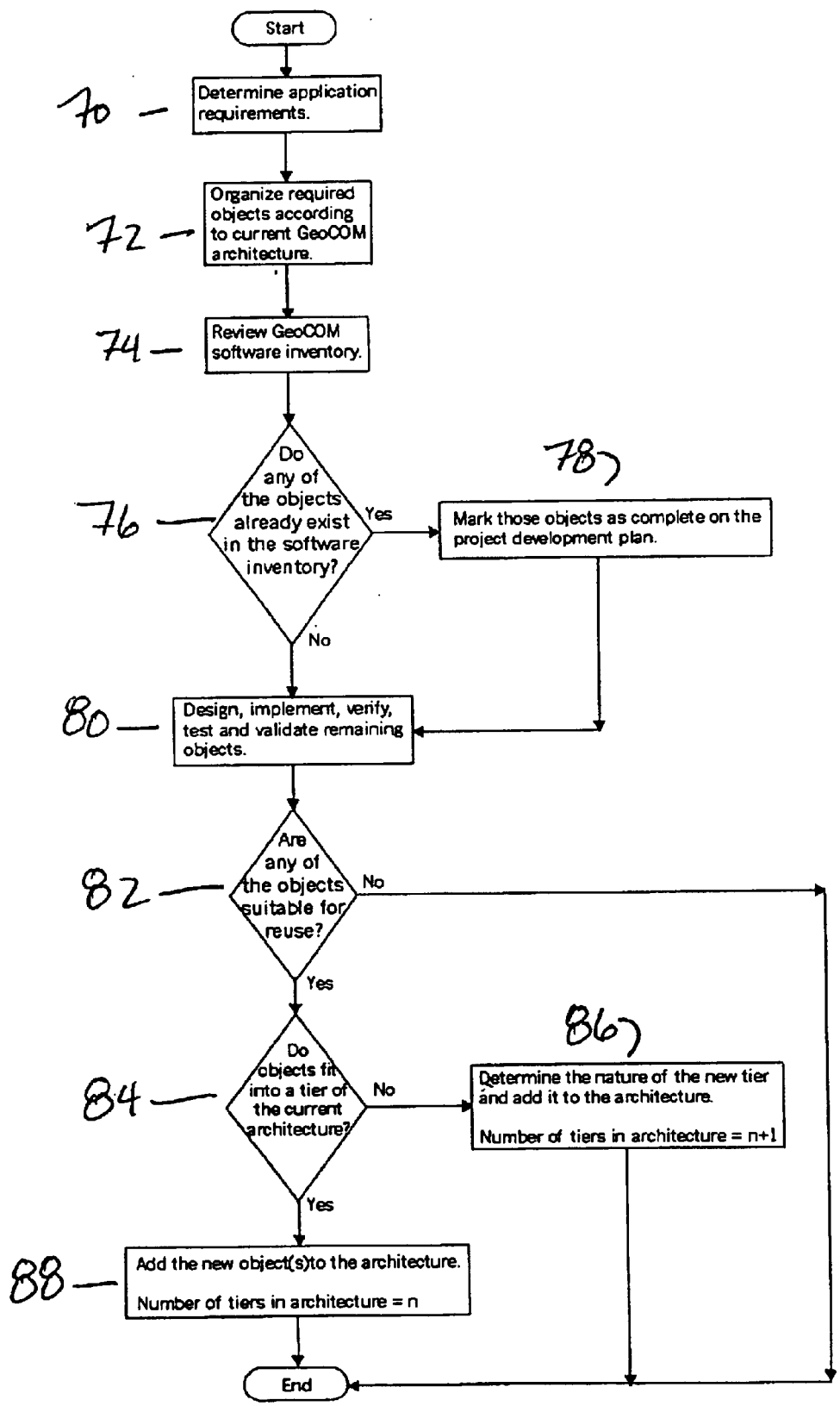
FIG. 6 is a flowchart generally describing the present invention's method for designing a software architecture for use in generating software components.

Referring now to FIG. 6, once a list of required models and software components 20 is determined 70, software components 20 are logically grouped 72. A determination 74, 76 is then made to determine if any of the software components 20 already exist in inventory 700. Whenever possible, software components 20 are reused 78 from inventory 700. Software components 20 that do not fit the current architecture may be restructured to ensure conformance while retaining the original intent of the requirement.

Additional software components 20 may be created 80 as needed after review of specifications and current inventory 700. After new or modified software components 20 successfully pass a testing and validation phase, new or modified software components 20 are assessed for suitability 82 to become part of inventory 700. Software components 20 that have potential for reuse are added 88 to inventory 700. These new or modified software components 20 may thus be integrated into a current architecture, expanding the current architecture, i.e., adding 86 one or more tiers 30 to accommodate them. By definition via the rigid implementation of standard interfaces, a software component 20 from one tier 30 can be used by any software component 20 from any other tier, making tier 30 relationships of little importance. However, in practice it is likely that certain software components 20 will primarily be used by certain other software components 20.

In the operation of the preferred embodiment, referring back to FIG. 4, a system designer using the present invention method to create a software architecture specifies 50 a set of software component rules 210 for creating software components 20.

The system designer also specifies 300 a set of tier rules 310 for creating tiers 30.

The system designer also specifies 400 a set of assembly rules 410. Linkage rules within assembly rules 410 allow for selected tiers 30 to be standalone, such as Testing or Wizard tiers 30. The system designer also specifies a set of interfaces for each tier 30, the interfaces defining a set of functionality capable within the tier 30. In some cases, a set of tiers 30 will be specified, each tier 30 within a set having the same defined set of functionality capability.

Once a software architecture is architected, a user of that software architecture uses the architecture and rules to specify an extensible N-tier architecture comprising a plurality of tiers 30, wherein each tier 30 is associatable with at least one software component 20. Software components 20, in turn, are specified according software component rules 200 that comprise rules on properties and interfaces for software components 20.

Referring now to FIG. 4 through FIG. 6, the method of present invention for system design for an N-tier architecture generally envisions implementing a set of principles, rules, and methods to effect a life cycle approach to creation of software-based applications using an architecture created using the present invention's rules and methods as discussed herein above. A set of rules are designed an implemented, by way of example and not limitation comprising rules 210 on creation and characteristics of software components 20; rules 310 on tiers 30 and maintenance of software components 20 within an inventory 700, including addition, modification, location, extraction, and deletion of software components within inventory 700; and rules 410 on building tiers 30 and applications.

In some implementations, it may be desirable to have a base set of software components 20 which can be used, either as templates or as actual software components 20. Accordingly, in these instances, a software designer would specify and create a base set of architected frameworks 40.

The present invention can be embodied in the form of computer-implemented processes and apparatuses for practicing those processes. Various aspects of the present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a general-purpose microprocessor, the computer program code segments configure the microprocessor to create specific logic circuits to carry out the desired process.

Therefore, a system for designing a software architecture for use in generating software components for building software applications can comprise numerous means for specifying a set of software component rules for creating software components, tiers, and assembly rules, all of which will be familiar to those of ordinary skill in the computer arts, including, by way of example and not limitation, keyboards, mice, drag-and-drop interfaces, text editors, graphical editors, OLE interfaces, and the like or any combination thereof. These means may further comprise manual processes, heuristic processes, automated processes, and the like, or any combination thereof, such as expert system driven or implemented designs, neural networks, and the like.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for designing a software architecture for utilizing software components in building N-tier software applications, the method comprising:

a) specifying a set of software component rules for developing software components;

b) specifying a set of tier rules for developing a plurality of tiers wherein each tier comprises a plurality of software components and performs a predetermined function, each software component comprising a software object, the tier rules further comprising:
i) a set of association rules by which at least one software component developed using the software component rules is associated with or disassociated from at least one tier developed with the set of tier rules;
ii) a set of tier framework rules to provide an architected context for software components associated with a tier; and
iii) a set of package rules to provide for logical grouping of interfaces within a framework defined by the tier framework rules to provide a set of specific behaviors for the tier; and
c) specifying a set of assembly rules, by which each tier is associated and linked to at least one other tier.

2. The method of claim 1 wherein specifying the set of software component rules for developing software components further comprises:
specifying rules for specifying interfaces for each software component; and
specifying rules for specifying behavior exhibited by each software component.

3. The method of claim 2 wherein specifying rules for specifying behavior further comprises:
specifying rules for encapsulating each software component; and
specifying rules for developing an interface reusable at a binary level for each software component;
whereby each software component is made available for use by any other software component that uses interface of the software component.

4. The method of claim 1 further comprising specifying library rules for selectively placing software components into and retrieving software components from an inventory of software components.

5. The method of claim 1 wherein the software component rules comprise rules for supporting off-the-shelf components within software components or tiers, including rules to allow addition of off-the-shelf software components into the inventory.

6. The method of claim 1 further comprising specifying at least one software component modification rule for adding, modifying, or deleting software components.

7. The method of claim 1 wherein the software component rules further comprise rules for designating software component function points.

8. The method of claim 7 wherein the rules for designating software component function points further comprise rules to allow implementing software component interfaces required by a particular tier to which the software component belongs.

9. The method of claim 1 wherein specifying a set of tier rules for developing an extensible set of tiers further comprises:
specifying rules for modifying software component attributes of software components associated with the tier;
specifying rules for determining dependencies between a framework and at least one other framework;
specifying rules for grouping properties and interfaces in the framework;
specifying rules for determining interfaces to be used in the framework.

10. The method of claim 1 wherein the framework rules further comprise rules on specifying at least one package for a framework, the package further comprising a set of interfaces to provide a specific behavior.

11. The method of claim 1 further comprising:
specifying a basic design structure comprising base components for software components in the tier; and
specifying a set of standard interfaces for the software components categorized as belonging to the tier.

12. The method of claim 1 wherein specifying the set of assembly rules further comprises:
specifying rules to allow assembling and compiling at least one tier to provide a stand-alone, executable program; and
specifying rules on allowing combining software components and invoking an assembled application at runtime to form new unique applications on-the-fly.

13. The method of claim 1 wherein the software component rules specify rules allowing each software component to execute asynchronously within its own thread and time frame and to inform dependent components of its status or provide dependent components with information when predetermined events occur.

14. The method of claim 1 further comprising specifying rules to allow defining one or more techniques to allow a software component to traverse a model, the model comprising one or more software components.

15. The method of claim 14 wherein the traversal of a model uses a predetermined interface.

16. The method of claim 1 further comprising specifying rules on implementing a template iterator class to facilitate accessing associations.

17. The method of claim 16 wherein the template iterator class is based on an association of software components and is used to iterate through all software components in the association or through a specific software component type.

18. A method for generating software components for use in an N tier software application, the software components having a predetermined structure, the method comprising:
providing a software component architecture comprising a plurality of tiers, wherein each tier comprises a plurality of software components and performs a predetermined function, each software component comprising a software object, each tier further comprising a predetermined set of interfaces for that tier, the interfaces defining a set of functionality capable within that tier;
specifying a set of association rules by which at least one software component developed using software component rules is associated with or disassociated from at least one tier developed with a set of tier rules;
specifying a set of tier framework rules to provide an architected context for software, components associated with a tier;
specifying package rules to provide for logical grouping of interfaces within a framework defined, by the tier framework rules to provide specific behaviors for the tiers;
specifying a set of assembly rules by which each tier is associated and linked to at least one other tier; and
wherein at least one of the software components in a selected one of the plurality of tiers provides a predetermined set of interfaces.

19. The method of claim 18 wherein the software components of a tier are reusable by a system configured to utilize the set of interfaces associated with the tier.

20. The method of claim 18 wherein the tier framework rules further comprise:
specifying rules for determining dependencies between a framework and at least one other framework;
specifying how properties and interfaces are grouped in the framework; and
specifying the interfaces to be used in the framework.

21. The method of claim 20 further comprising specifying rules on defining packages within the framework, each package comprising a group of interfaces that specify how a specific behavior is to be implemented in the framework.

22. A method of system design for an N-tier architecture, the architecture comprising software components and tiers, the method comprising:
determining a set of application requirements;
determining a list of software components to satisfy the application requirements, wherein each software components comprises a software object;
logically grouping the software components into extensible tiers, the tiers having a set of tier rules, the tier rules comprising a set of association rules by which at least one software components developed using software component rules is associated with or disassociated from at least one tier developed with the set of tier rules, the tier rules further comprising a set of tier framework rules to provide an architected context for software components associated with a tier, the tier rules further comprising a set of package rules to provide for logical grouping of interfaces within a framework defined by the tier framework rules to provide a set of specific behaviors for the tier; specifying a set of rules by which each tier is associated and linked to at least one other tier.

23. The method of claim 22 further comprising:
testing each added software component;
testing each restructured software component;
assessing each added software component for suitability to become part of the software inventory;
assessing each restructured software component for suitability to become part of the software inventory; and
adding at least a portion of the added or restructured components to the inventory.

24. The method of claim 22 wherein the added or restructured software components are either tailored into the current architecture or the architecture is expanded by adding one or more tiers to accommodate the added or restructured software component.

25. The method of claim 22 where the software components that are only to be utilized in a current application are not added to the inventory.

26. The method of claim 22 wherein adding additional software components if no existing software component in the inventory satisfies a requirement or is modifiable to satisfy the requirement, further comprises:
procuring an off-the-shelf software component from a third party; and
providing the off-the-shelf software component with a predetermined interface to interface between the off-the-shelf software component and at least one tier.

27. A system for designing a software architecture for use in, generating software components for building software applications, the system comprising: at least one processing unit;
at least one memory store operatively connected to the processing unit;
N-tier design software executable within the at least one processing unit, wherein each tier comprises a plurality of software components and performs a predetermined function, each software component comprising a software object;
software architecture specifications resident in the memory store for use by the N tier design software, the software architecture specifications comprising specifications for a set of software component rules for developing software components, specifications of a set of tier rules for developing tiers, and specifications of a set of assembly rules the tier rules comprising a set of association rules by which at least one software component developed using software component rules is associated with or disassociated from at least one tier developed with a set of tier rules, the tier rules further comprising a set of tier framework rules to provide an architected context for software components associated with a tier, the tier rules further comprising a set of package rules to provide for logical grouping of interfaces within a framework defined by the tier framework rules to provide a set of specific behaviors for the tier, the set of assembly rules associating and linking each tier with at least one other tier;
an input device, operatively in communication with the processing unit, for permitting input of the software architecture specifications; an output device, operatively in communication with the processing unit; and a communications pathway operatively connected to the processing unit.

28. The system of claim 27 wherein the communications pathway is a network.

29. The system of claim 28 wherein the network utilizes at least one of asynchronous communication and synchronous communication between the software components.

30. A system for designing a software architecture for use in generating software for building software applications, the system comprising:
a) means for specifying a set of software component rules for developing software components;
b) means for specifying a set of tier rules for developing a plurality of tiers wherein each tier comprises a plurality of software components and performs a predetermined function, each software component comprising a software object, the tier rules further comprising:
i) a set of association rules by which each tier developed with the set of tier rules is associated with at least one software component developed using the software component rules;
ii) a set of tier framework rules to provide an architected context for software components within a tier; and
iii) a set of package rules to provide for logical grouping of interfaces within a framework defined by the tier framework rules to provide a set of specific behaviors for the tier; and
c) means for specifying a set of assembly rules further comprising association rules by which each tier is associated with at least one software component and linkage rules by which each tier is linked to at least one other tier.

31. A method for defining and implementing an N-tier software architecture for a system comprising at least one processing unit, at least one memory store operatively connected to the processing unit, N-tier designing software executable within the at least one processing unit, an input device operatively in communication with the processing unit for permitting input of the software architecture specifications, an output device operatively in communication with the processing unit, and a communications pathway operatively connected to the processing unit, the method comprising:

a) loading the N-tier designing software into the memory store;

b) executing the N-tier designing software;

c) inputting a set of software component rules for developing software components into the memory store;

d) inputting a set of tier rules for developing a plurality of tiers into the memory store, the tier rules further comprising:

i) a set of association rules by which each tier developed with the set of tier rules is associated with at least one software component developed using the software component rules;

ii) a set of tier framework rules to provide an architected context for software components within a tier; and iii) a set of package rules to provide for logical grouping of interfaces within a framework defined by the tier framework rules to provide a set of specific behaviors for the tier, e) inputting a set of assembly rules into the memory store, the assembly rules further comprising association rules by which each tier is associated with at least one software component and linkage rules by which each tier is linked to at least one other tier; and f) processing the software component rules, tier rules, and assembly rules using the N-tier designing software to develop an N-tier software architecture, wherein each tier comprises a plurality of software components and performs a predetermined function, each software component comprising a software object.

32. An N-tier software architecture stored in a storage media, the storage media comprising;

a first plurality of binary values for developing software components using software component rules;

a second plurality of binary values for developing a plurality of tiers using tier rules wherein each tier comprises a plurality of software components and performs a predetermined function, each software component comprising a software object, the tier rules comprising a set of association rules by which at least one software component developed using software component rules is associated with or disassociated from at least one tier developed with the set of tier rules, the tier rules further comprising a set of tier framework rules to provide an architected context for software components associated with a tier, the tier rules further comprising a set of package rules to provide for logical grouping of interfaces within a framework defined by the tier framework rules to provide a set of specific behaviors for the tier; and a third plurality of binary values for assembling software applications from tiers and software component, the third plurality of binary value associating and linking each tier with at least one other tier.

33. An article of manufacture, comprising;

a computer storage medium having a computer program encoded therein for designing a software architect for utilizing software components in building multiple tier software applications, the computer storage medium including:

code for specifying a set of software component rules for developing software components wherein each software component comprises a software object;

code for specifying a set of tier rules for developing a plurality of tiers wherein each tier comprises a plurality of software components and performs a predetermined function, the tier rules comprising a set of association rules by which at least one software component developed using software component rule is associated with or disassociated from at least one tier developed with the set of tier rules, the tier rules further comprising a set of tier framework rues to provide an architected context for software components associated with a tier, the tier rules further comprising a set of package rules to provide or logical grouping of interfaces within a framework defined by the tier framework rules to provide a set of specific behaviors or the tier; and code for specifying a set of assembly rules by which each tier is associated and linked to at least one other tier.

* * * * *